J. W. CLAYTON.
COTTON CHOPPER.
APPLICATION FILED NOV. 30, 1912.
1,070,873. Patented Aug. 19, 1913.
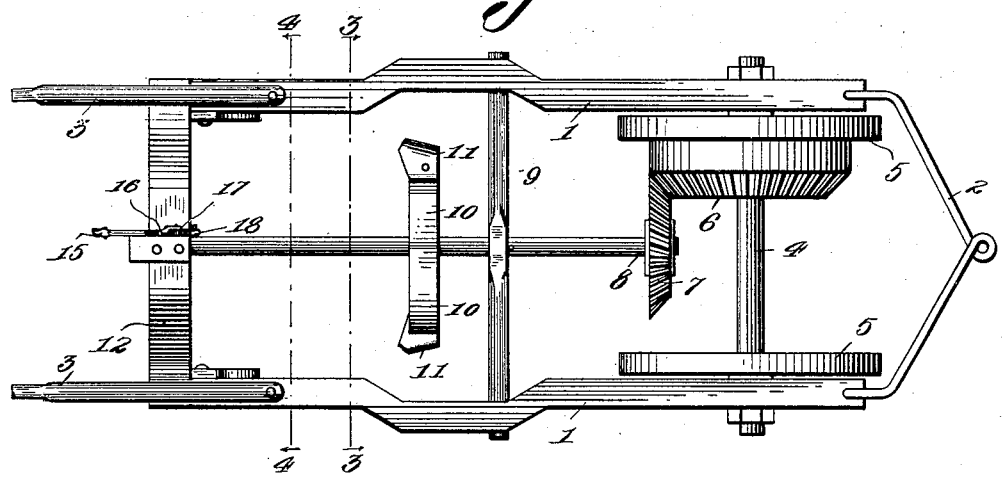
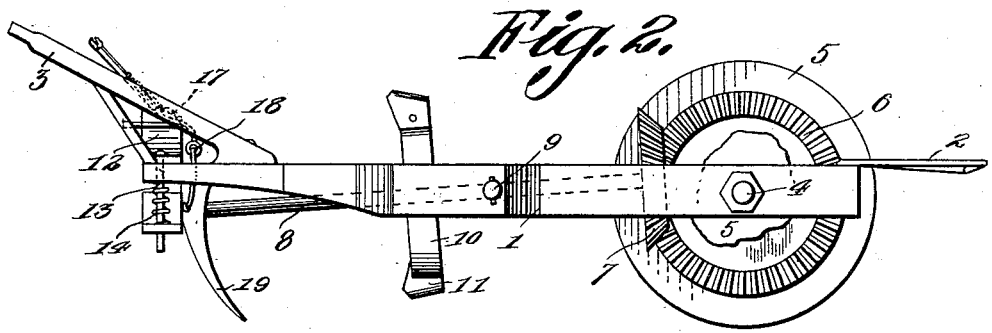
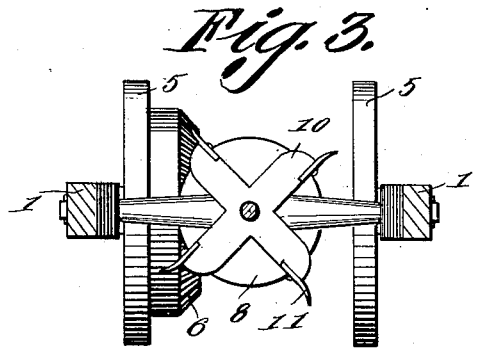 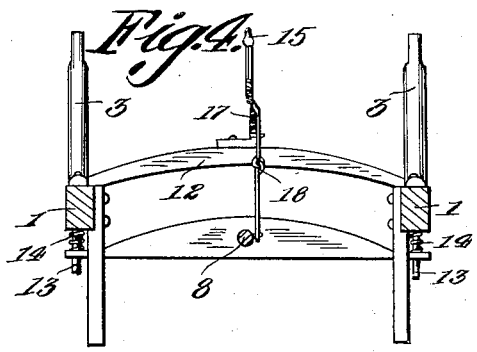
John W. Clayton,
Inventor
Witnesses
By 
Attorney

UNITED STATES PATENT OFFICE.

JOHN W. CLAYTON, OF YANTIS, TEXAS.

COTTON-CHOPPER.

1,070,873.

Specification of Letters Patent. Patented Aug. 19, 1913.

Application filed November 30, 1912. Serial No. 734,268.

*To all whom it may concern:*

Be it known that I, JOHN W. CLAYTON, a citizen of the United States, residing at Yantis, in the county of Wood and State of Texas, have invented certain new and useful Improvements in Cotton-Choppers, of which the following is a specification.

My invention relates to improvements in cotton choppers, and the objects are the provision of an implement of this character which will perform its work in a thorough and practical manner; which will be of simple and inexpensive construction; which will be strong and durable and thoroughly efficient in every particular.

With these objects in view, my invention consists of a cotton chopper embodying novel features of construction and combination of parts substantially as disclosed herein.

In order that the detailed construction and the operation of my cotton chopper may be fully understood and its advantages be fully appreciated, I have illustrated in the accompanying drawings an implement constructed in accordance with and embodying my invention.

Figure 1 is a top plan view of the complete cotton chopper. Fig. 2 is a side elevation of the implement. Fig. 3 is a section on line 3—3 of Fig. 1, and Fig. 4 is a section on line 4—4 of Fig. 1.

Referring by numerals to the drawings in which similar characters denote corresponding parts in all the views of the drawings: the numeral 1 designates a pair of parallel bars which constitutes the frame of the implement, to the forward end of which frame is connected the draft adjustment 2, and upon the rear of the frame is secured a pair of handles 3, it being understood that a draft device for one or two animals may be used. In the forward portion of the frame is mounted the axle 4, upon which is arranged a pair of ground wheels 5, contiguous with one of which and on the axle is placed a driving bevel gear wheel 6, which meshes with the bevel gear wheel 7, on one end of the shaft 8. This shaft is secured upon the pivoted transverse bar 9, which permits of a proper play or movement of the shaft upon which is mounted the series of radial arms 10, each carrying a chopper or hoe 11. From this construction it will be observed that as the machine is drawn over the ground upon the ground wheels, that rotation is transmitted to the shaft which carries the series of chopping hoes and the inner or other end of the shaft is fitted in a cross piece or bar 12, centrally thereon and this cross piece has a vertical movement with reference to the frame upon the pair of depending studs 13, and is made yielding or given an elastic action through the medium of the pair of coil springs 14, surrounding the studs and bearing upon the cross piece to the pair of frame bars or members. This enables the shaft through the medium of the cross piece to have a yielding action to prevent the chopping hoes from being injured by getting in contact with a log or hard substance, which construction forms the most important feature of my invention. To operate the spring cross piece and adjust the shaft which carries the chopping devices, I provide the hand lever 15, having the spring dog 16, which engages the rack 17, the lever being connected with the cross piece by means of the link 18, and the lever thus can be operated to move shaft 8 and tilt bar 9 to throw the gears 6 and 7 out of mesh when the hoes are raised to inoperative position, but should an obstruction be met with the springs would yield and permit a movement of the shaft and allow the chopping hoes to clear such obstruction.

To the pair of frame bars near their end and upon their inner side slightly in advance of the spring support for the shaft is secured the pair of plows or plowers 19, whose function is to lift the soil and loosen it after the chopper has performed its operation.

The advantages of my cotton chopper will be readily understood and appreciated by persons acquainted with implements of this character, and it will be at once apparent that the machine is simple, strong and durable in construction, can be sold at a price to bring it within reach of all requiring such an implement, that it will effectively operate upon the plants and the ground, and that the most important feature is the adjustment of the chopping means and their spring support which prevents damage to the chopping means, and also allows instant adjustment according to the character of the work.

I claim:

The cotton chopper herein described, consisting of the frame, the axle mounted in the frame and carrying ground wheels, a driving bevel gear wheel secured to the axle, a cross bar pivotally mounted in the frame, a longitudinal shaft connected with said cross bar, a bevel gear on one end of the shaft meshing with the driving bevel gear, a cotton chopping wheel mounted on said shaft intermediate of its length, a cross piece in which the other end of said shaft bears, studs depending from the frame and engaging the ends of the cross piece to guide said cross piece, springs around the studs between the frame and cross piece, and a hand lever connected with the cross piece for throwing the gears out of mesh, and means for retaining the lever in the desired adjustment.

In testimony whereof I affix my signature in presence of two witnesses.

JOHN W. CLAYTON.

Witnesses:
FRANK CLAYTON,
W. M. CRADDOCK.

---

Copies of this patent may be obtained for five cents each, by addressing the "Commissioner of Patents, Washington, D. C."